United States Patent
Gordon et al.

(10) Patent No.: US 8,312,535 B1
(45) Date of Patent: Nov. 13, 2012

(54) SYSTEM, METHOD, AND COMPUTER PROGRAM PRODUCT FOR INTERFACING A PLURALITY OF RELATED APPLICATIONS

(75) Inventors: Bryson P. Gordon, Campbell, CA (US); Ryan L. Schneider, Oakwood, OH (US)

(73) Assignee: McAfee, Inc., Santa Clara, CA (US)

( * ) Notice: Subject to any disclaimer, the term of this patent is extended or adjusted under 35 U.S.C. 154(b) by 921 days.

(21) Appl. No.: 10/318,559

(22) Filed: Dec. 12, 2002

(51) Int. Cl.
  *G06F 11/00* (2006.01)

(52) U.S. Cl. ............ 726/22; 726/23; 726/24; 726/25; 713/188

(58) Field of Classification Search ............ 726/25, 726/11, 23; 713/152
See application file for complete search history.

(56) References Cited

U.S. PATENT DOCUMENTS

| | | | |
|---|---|---|---|
| 4,899,136 A | 2/1990 | Beard et al. | |
| 5,121,430 A | 6/1992 | Ganzer | |
| 5,333,256 A | 7/1994 | Green et al. | |
| 5,657,460 A | 8/1997 | Egan et al. | |
| 5,870,543 A | 2/1999 | Ronning | |
| 5,956,481 A | 9/1999 | Walsh et al. | |
| 5,991,881 A | 11/1999 | Conklin et al. | |
| 6,035,423 A | 3/2000 | Hodges et al. | |
| 6,088,804 A | 7/2000 | Hill et al. | |
| 6,205,552 B1 | 3/2001 | Fudge | |
| 6,266,774 B1 | 7/2001 | Sampath et al. | |
| 6,269,456 B1 | 7/2001 | Hodges et al. | |
| 6,282,709 B1 | 8/2001 | Reha et al. | |
| 6,298,445 B1 | 10/2001 | Shostack et al. | |
| 6,304,975 B1 | 10/2001 | Shipley | |
| 6,327,594 B1 | 12/2001 | Van Huben et al. | |
| 6,329,904 B1 | 12/2001 | Lamb | |
| 6,357,008 B1 | 3/2002 | Nachenberg | |
| 6,493,871 B1 | 12/2002 | McGuire et al. | |
| 6,535,227 B1 | 3/2003 | Fox et al. | |
| 6,553,378 B1 | 4/2003 | Eschelbeck | |
| 6,567,808 B1 * | 5/2003 | Eschelbeck et al. | 707/10 |
| 6,704,874 B1 | 3/2004 | Porras et al. | |
| 6,711,615 B2 * | 3/2004 | Porras et al. | 709/224 |
| 6,715,083 B1 | 3/2004 | Tovander | |
| 6,785,732 B1 * | 8/2004 | Bates et al. | 709/232 |
| 6,816,878 B1 | 11/2004 | Zimmers | |
| 6,871,214 B2 | 3/2005 | Parsons et al. | |
| 6,898,715 B1 * | 5/2005 | Smithson et al. | 726/24 |
| 6,941,467 B2 | 9/2005 | Judge et al. | |
| 6,948,169 B1 | 9/2005 | Amro et al. | |
| 6,952,779 B1 | 10/2005 | Cohen et al. | |
| 6,966,059 B1 | 11/2005 | Shetty et al. | |
| 6,976,251 B2 | 12/2005 | Meyerson | |
| 6,980,927 B2 | 12/2005 | Tracy et al. | |
| 7,007,301 B2 | 2/2006 | Crosbie et al. | |

(Continued)

OTHER PUBLICATIONS

News Release "Symantec to Support New Version of Virus Scanning API for Microsoft Exchange 2000" Jun. 25, 2001.*

(Continued)

*Primary Examiner* — Christopher Brown
(74) *Attorney, Agent, or Firm* — Wong, Cabello, Lutsch, Rutherford & Brucculeri, LLP

(57) ABSTRACT

A system, method and computer program product are provided for interfacing a plurality of applications. Initially, a signal is received at an interface indicating that a first application has responded to an event with a first response. The interface, in turn, prompts a second response to the event by a second application.

35 Claims, 9 Drawing Sheets

U.S. PATENT DOCUMENTS

| | | | |
|---|---|---|---|
| 7,010,696 | B1 | 3/2006 | Cambridge et al. |
| 7,080,000 | B1 | 7/2006 | Cambridge |
| 7,096,215 | B2 | 8/2006 | Bates et al. |
| 7,114,183 | B1 | 9/2006 | Joiner |
| 7,127,743 | B1 | 10/2006 | Khanolkar et al. |
| 7,134,141 | B2 | 11/2006 | Crosbie et al. |
| 7,137,145 | B2 | 11/2006 | Gleichauf |
| 7,174,566 | B2 | 2/2007 | Yadav |
| 7,181,519 | B2 | 2/2007 | Pillai et al. |
| 7,233,781 | B2 | 6/2007 | Hunter et al. |
| 7,305,709 | B1 | 12/2007 | Lymer et al. |
| 7,308,697 | B1 | 12/2007 | Jerding |
| 7,353,229 | B2 | 4/2008 | Vilcauskas et al. |
| 7,434,177 | B1 | 10/2008 | Ording et al. |
| 7,444,679 | B2 | 10/2008 | Tarquini et al. |
| 7,555,776 | B1 | 6/2009 | Lymer et al. |
| 7,603,432 | B2 | 10/2009 | Warner |
| 7,606,821 | B2 | 10/2009 | Leahy et al. |
| 7,624,450 | B1 | 11/2009 | Lymer et al. |
| 7,640,434 | B2 | 12/2009 | Lee et al. |
| 7,882,193 | B1 * | 2/2011 | Aronson et al. ............... 709/207 |
| 7,921,459 | B2 | 4/2011 | Houston et al. |
| 7,924,149 | B2 | 4/2011 | Mendelson |
| 8,019,688 | B2 | 9/2011 | Hunter et al. |
| 2002/0019945 | A1 | 2/2002 | Houston et al. |
| 2002/0046299 | A1 | 4/2002 | Lefeber et al. |
| 2002/0052950 | A1 | 5/2002 | Pillai et al. ..................... 709/224 |
| 2002/0059095 | A1 | 5/2002 | Cook |
| 2002/0078382 | A1 | 6/2002 | Sheikh et al. |
| 2002/0083343 | A1 | 6/2002 | Crosbie et al. |
| 2002/0087643 | A1 | 7/2002 | Parsons et al. ................ 709/206 |
| 2002/0133522 | A1 | 9/2002 | Greetham et al. |
| 2002/0147803 | A1 | 10/2002 | Dodd et al. |
| 2002/0171546 | A1 * | 11/2002 | Evans et al. .................... 340/540 |
| 2002/0178381 | A1 | 11/2002 | Lee et al. ....................... 713/201 |
| 2003/0084322 | A1 * | 5/2003 | Schertz et al. ................ 713/200 |
| 2003/0084340 | A1 | 5/2003 | Schertz et al. |
| 2003/0120733 | A1 | 6/2003 | Forman |
| 2003/0135749 | A1 | 7/2003 | Gales et al. |
| 2003/0149888 | A1 * | 8/2003 | Yadav ........................... 713/200 |
| 2003/0154269 | A1 | 8/2003 | Nyanchama et al. |
| 2003/0172301 | A1 | 9/2003 | Judge et al. ................... 713/201 |
| 2003/0191966 | A1 * | 10/2003 | Gleichauf ...................... 713/201 |
| 2003/0208687 | A1 | 11/2003 | Liang et al. |
| 2004/0006704 | A1 | 1/2004 | Dahlstrom et al. |
| 2004/0015719 | A1 * | 1/2004 | Lee et al. ....................... 713/201 |
| 2004/0064722 | A1 | 4/2004 | Neelay et al. |
| 2004/0083474 | A1 | 4/2004 | McKinlay et al. |
| 2004/0148281 | A1 | 7/2004 | Bates et al. ........................ 707/3 |
| 2004/0181685 | A1 | 9/2004 | Marwaha |
| 2004/0225877 | A1 | 11/2004 | Huang |
| 2004/0250133 | A1 * | 12/2004 | Lim ............................... 713/201 |
| 2005/0010649 | A1 | 1/2005 | Payne et al. |
| 2005/0086685 | A1 | 4/2005 | Rahman |
| 2006/0021031 | A1 | 1/2006 | Leahy et al. |
| 2006/0080735 | A1 | 4/2006 | Brinson et al. |
| 2006/0129947 | A1 | 6/2006 | Hamzy et al. |
| 2007/0273499 | A1 | 11/2007 | Chlubek et al. |
| 2008/0046524 | A1 | 2/2008 | Jerding |
| 2009/0144155 | A1 | 6/2009 | Lora |
| 2011/0270940 | A1 | 11/2011 | Johnson |

OTHER PUBLICATIONS

Norton AntiVirus 2002 Users Guide (2001).*
Norton Internet Security Professional 2002 User's Guide (2001).*
Norton Internet Security Professional 2003 User's Guide (2002).*
Office Action from U.S. Appl. No. 10/319,288 mailed Apr. 18, 2006.
Office Action from U.S. Appl. No. 10/318,693 mailed May 8, 2006.
Office Action from U.S. Appl. No. 10/325,025 mailed Jun. 22, 2006.
Norton Internet Security, Professional User's Guide: 2002.
Office Action from U.S. Appl. No. 10/325,170 mailed Jul. 5, 2006.
Office Action Summary from U.S. Appl. No. 10/318,693 which was mailed on Oct. 5, 2006.
"Norton Internet Security User's Guide 2001" © 1995-2000 Symantec Corporation.
Office Action Summary from U.S. Appl. No. 10/319,288 which was mailed on Nov. 1, 2006.
Office Action Summary from U.S. Appl. No. 10/325,025 which was mailed on Jan. 29, 2007.
Office Action Summary from U.S. Appl. No. 10/318,693 which was mailed on Dec. 21, 2006.
Office Action Summary from U.S. Appl. No. 10/325,025 mailed Oct. 17, 2007.
Notice of Allowance from U.S. Appl. No. 10/325,170 mailed Feb. 5, 2007.
Norton Internet Security, Professional User's Guide: 2002—pp. 196-206.
Final Office Action Summary from U.S. Appl. No. 10/319,288 mailed on Nov. 28, 2007.
Office Action Summary from U.S. Appl. No. 10/318,693 which was mailed on May 30, 2007.
Office Action Summary from U.S. Appl. No. 10/325,025 mailed on May 16, 2008.
Examiner's Answer from U.S. Appl. No. 10/318,693 which was mailed on Apr. 17, 2008.
Office Action Summary from U.S. Appl. No. 10/319,288 mailed on Feb. 5, 2009.
Office Action Summary from U.S. Appl. No. 11/735,877 mailed on Dec. 24, 2008.
Final Office Action Summary from U.S. Appl. No. 10/325,025 mailed on Dec. 2, 2008.
Final Office Action Summary from U.S. Appl. No. 10/319,288 mailed on Sep. 17, 2009.
U.S. Appl. No. 11/855,072, filed Sep. 13, 2007.
U.S. Appl. No. 12/624,325, filed Nov. 23, 2009.
Examiner's Answer from U.S. Appl. No. 10/325,025 which was mailed on Oct. 29, 2009.
Phillips, C. et al., A Graph-Based System for Network-Vulnerability Analysis, Proceedings of the 1998 workshop on New security paradigms, 1998, pp. 71-79, ACM, New York, NY, USA.
Symantec Corporation, Norton AnitiVirus™ Corporate Edition User's Guide, 2000, pp. 1-38, Version 7.5, Cupertino, CA, USA.
Farris, D., Ontrack SystemSuite 3.0, Apr. 27, 2001, pp. 1-8, retrieved from http://web.archive.org/web/20010427043719/http://www.gtpcc.org/gtpcc/systemsuite.htm on Feb. 2, 2011.
Non-Final Office Action from U.S. Appl. No. 11/855,072, dated Aug. 25, 2010.
Advisory Action from U.S. Appl. No. 10/319,288, dated Feb. 14, 2007.
Final Office Action from U.S. Appl. No. 10/319,288, dated Sep. 17, 2009.
Non-Final Office Action from U.S. Appl. No. 10/319,288, dated Feb. 5, 2009.
Non-Final Office Action from U.S. Appl. No. 11/855,941, dated Jul. 22, 2010.
Final Office Action from U.S. Appl. No. 10/325,025, dated Dec. 2, 2008.
Notice of Allowance from U.S. Appl. No. 11/855,953, dated Feb. 24, 2009.
Non-Final Office Action from U.S. Appl. No. 11/855,953, dated Aug. 18, 2008.
Final Office Action from U.S. Appl. No. 12/470,163, dated Sep. 9, 2010.
Notice of Allowance from U.S. Appl. No. 11/735,877, dated Jul. 29, 2009.
Non-Final Office Action from U.S. Appl. No. 11/735,877, dated Dec. 24, 2008.
Final Office Action from U.S. Appl. No. 11/855,109, dated Nov. 3, 2010.
Non-Final Office Action from U.S. Appl. No. 11/855,109, dated May 14, 2010.
Non-Final Office Action from U.S. Appl. No. 12/624,325, dated Dec. 14, 2010.
U.S. Appl. No. 10/318,693, filed Dec. 12, 2002.
U.S. Appl. No. 10/319,288, filed Dec. 13, 2002.
U.S. Appl. No. 11/855,941, filed Sep. 14, 2007.
U.S. Appl. No. 10/325,025, filed Dec. 19, 2009.
U.S. Appl. No. 11/855,109, filed Sep. 13, 2007.
US Application for "Combined Multiple-Application Alert System and Method," U.S. Appl. No. 10/318,693.

US Application for "System, Method and Computer Program Product for Managing a Plurality of Applications via a Single Interface" U.S. Appl. No. 10/319,288.
US Application for "System, Method, and Computer Program Product for Conveying a Status of a Plurality of Security Applications," U.S. Appl. No. 10/325,170.
Office Action dated Dec. 14, 2010, U.S. Appl. No. 12/324,325.
Office Action dated May 14, 2010, U.S. Appl. No. 11/855,109.
Final Office Action dated Nov. 3, 2010, U.S. Appl. No. 11/855,109.
Advisory Action dated Jan. 29, 2010, U.S. Appl. No. 10/318,559.
Advisory Action dated Mar. 30, 2007, U.S. Appl. No. 10/318,559.
Final Office Action dated Jan. 11, 2007, U.S. Appl. No. 10/318,599.
Final Office Action dated Feb. 25, 2008, U.S. Appl. No. 10/318,559.
Final Office Action dated Nov. 12, 2009, U.S. Appl. No. 10/318,559.
Office Action dated Jun. 21, 2006, U.S. Appl. No. 10/318,559.
Office Action dated May 16, 2006, U.S. Appl. No. 10/318,559.
Office Action dated Jul. 24, 2007, U.S. Appl. No. 10/318,559.
Office Action dated Jul. 3, 2008, U.S. Appl. No. 10/318,559.
Office Action dated Nov. 10, 2008, U.S. Appl. No. 10/318,559.
Office Action dated Apr. 24, 2009, U.S. Appl. No. 10/318,559.
Office Action dated Aug. 18, 2010 U.S. Appl. No. 10/318,559.
Office Action dated Aug. 25, 2010, U.S. Appl. No. 11/855,072.
Examiner's Answer dated Apr. 17, 2008, U.S. Appl. No. 10/318,693.
Final Office Action dated May 30, 2007, U.S. Appl. No. 10/318,693.
Final Office Action dated Oct. 5, 2006, U.S. Appl. No. 10/318,693.
Office Action dated May 8, 2006, U.S. Appl. No. 10/318,693.
Office Action dated Dec. 21, 2006, U.S. Appl. No. 10/318,693.
Advisory Action dated Feb. 14, 2007, U.S. Appl. No. 10/319,288.
Final Office Action dated Sep. 17, 2009, U.S. Appl. No. 10/319,288.
Final Office Action dated Nov. 1, 2006, U.S. Appl. No. 10/319,288.
Final Office Action dated Nov. 28, 2007 U.S. Appl. No. 10/319,288.
Office Action dated Feb. 5, 2009, U.S. Appl. No. 10/319,288.
Office Action dated Apr. 18, 2006, U.S. Appl. No. 10/319,288.
Office Action dated Jun. 14, 2007, U.S. Appl. No. 10/319,288.
Office Action dated Jul. 22, 2010, U.S. Appl. No. 11/855,941 U.S. Appl. No. 10/319,288.
Examiner's Answer dated Oct. 29, 2009, U.S. Appl. No. 10/325,025.
Final Office Action dated Dec. 2, 2008 U.S. Appl. No. 10/325,025.
Final Office Action dated Jan. 29, 2007, U.S. Appl. No. 10/325,025.
Office Action dated May 16, 2008, U.S. Appl. No. 10/325,025.
Office Action dated Jun. 22, 2006, U.S. Appl. No. 10/325,025.
Office Action dated Oct. 17, 2007, U.S. Appl. No. 10/325,025.
Office Action dated Sep. 9, 2010 U.S. Appl. No. 10/325,025.
Notice of Allowance dated Feb. 5, 2007, U.S. Appl. No. 10/325,170.
Office Action dated Jul. 5, 2006, U.S. Appl. No. 10/325,170.
Notice of Allowance dated Jul. 29, 2009 U.S. Appl. No. 11/735,877.
Office Action dated Dec. 24, 2008, U.S. Appl. No. 11/735,877.
Notice of Allowance dated Feb. 24, 2009, U.S. Appl. No. 11/855,953.
Office Action dated Aug. 18, 2008, U.S. Appl. No. 11/855,953.
News Release "Symantec to Support New Version of Virus Scanning API for Microsoft Exchange 2000" Jun. 25, 2001, Cupertino, CA, retrieved from http://www.symantec.com/press/2001/n010625a.html on Feb. 8, 2011.
Phillips, et al. "A Graph-Based System for Network Vulnerability Analysis" ACM, 1999 pp. 71-79.

Dale Farris, "Ontrack SystemSuite 3.0," obtained from http://web.archive.org/web/20010427043719/http://www.gtpcc.org/gtpcc/systemsuite.htm generated on Feb. 2, 2011, 9 pages.
"Norton AntiVirus Corporate Edition User's Guide," EIC 2100, Copyright © 1999, 2000 Symantec Corporation, Documentation Version 7.5, 37 pages.
"Norton AntiVirus User's Guide: Norton AntiVirus 2002," Copyright © 2001 Symantec Corporation, Documentation version 8.0, PN: 07-30-00469, 90 pages.
"Norton Internet Security 2003: User's Guide," Copyright © 2002 Symantec Corporation, Documentation version 6.0, PN: 10024898, 255 pages.
"Norton Internet Security Professional User's Guide: Norton Internet Security 2002 Profession Edition," Copyright © 2001, Symantec Corporation, Documentation version 1.0, PN: 07-30-00481, 253 pages.
"Norton Internet Security User's Guide: Norton Internet Security 2001," Copyright © 1995-2000 Symantec Corporation, Documentation version 2.5, PN: 07-30-00432, 61 pages.
Final Office Action dated Apr. 27, 2011 in related U.S. Appl. No. 11/855,072.
Advisory Action dated Jul. 18, 2011 in related U.S. Appl. No. 11/855,072.
Office Action dated Oct. 7, 2011 in related U.S. Appl. No. 11/855,072.
Final Office Action dated Mar. 20, 2012 in related U.S. Appl. No. 11/855,072.
Final Office Action dated Apr. 1, 2011 in related U.S. Appl. No. 11/855,941.
Advisory Action dated Jun. 20, 2011 in related U.S. Appl. No. 11/855,941.
Office Action dated Nov. 14, 2011 in related U.S. Appl. No. 11/855,941.
Office Action dated Sep. 29, 2011 in related U.S. Appl. No. 10/325,025.
Notice of Allowance dated Apr. 3, 2012 in related U.S. Appl. No. 10/325,025.
Final Office Action dated May 10, 2011 in related U.S. Appl. No. 12/470,163.
Office Action dated Jul. 28, 2011 in related U.S. Appl. No. 12/470,163.
Final Office Action dated Jan. 13, 2012 in related U.S. Appl. No. 12/470,163.
Notice of Allowance dated Mar. 22, 2012 in related U.S. Appl. No. 12/470,163.
Office Action dated May 25, 2011 in related U.S. Appl. No. 10/318,693, Jul. 11, 2012.
Notice of Allowance Oct. 24, 2011 in related U.S. Appl. No. 10/318,693.
Notice of Allowance dated Jun. 10, 2011 in related U.S. Appl. No. 12/624,325.
Notice of Allowance dated Aug. 8, 2011 in related U.S. Appl. No. 12/624,325.
Notice of Allowance dated Sep. 29, 2011 in related U.S. Appl. No. 11/855,109.

* cited by examiner

SYSTEM, METHOD, AND COMPUTER PROGRAM PRODUCT FOR INTERFACING A PLURALITY OF RELATED APPLICATIONS

FIELD OF THE INVENTION

The present invention relates to application management, and more particularly to the interaction of a plurality of applications.

BACKGROUND OF THE INVENTION

Security threats have evolved significantly over the past years. Advanced hybrid threats, have been designed to attack systems on multiple fronts, sometimes searching for vulnerabilities until one is found. New threats also attempt to attack security technology itself.

Traditional consumer security software suites often included a plurality of various applications such as an anti-virus application, a firewall application, etc. These applications existed in such software suites as a simple bundle. In other words, each application secures a particular domain in a vacuum. As such, the anti-virus application may do a stringent scan, but the firewall application may not take any action at all, and so on.

All security applications perform actions. Some of these actions are trivial and some are more sophisticated. More importantly, other security applications may benefit from being informed as to when these actions occur. For example, when an anti-virus application detects and cleans a virus, it may be beneficial for other installed security applications to respond in kind.

Prior Art FIG. 1 illustrates one exemplary prior art system 10 where one application may interact with another. As shown, a first application 12 and a second application 14 are included in an application suite 16. In such prior art system 10, the first application 12 is equipped with a specific command 15 (i.e. execute operation X, etc.) that may be directly transmitted to the second application 14 to prompt a response from the second application 14.

Unfortunately, such prior art system 10 is overly simplistic and ineffective in enabling communications across a larger number of applications. There is simply no current technique of accomplishing effective cross-application communication. There is thus a need for an effective technique of granting security applications the ability to communicate with each other.

DISCLOSURE OF THE INVENTION

A system, method and computer program product are provided for interfacing a plurality of applications. Initially, a signal is received at an interface indicating that a first application has responded to an event with a first response. The interface, in turn, prompts a second response to the event by a second application.

In one embodiment, the interface may include an application program interface. Moreover, the first application and the second application may include an anti-virus application, a firewall application, a content filtering application, an anti-spam application, and/or a utilities application.

In another embodiment, the first response may be identified in a first library utilizing the interface. Such first library may be a component of the first application. Further, the first library may be installed with the first application. Still yet, the first response may be correlated with the second response in a second library utilizing the interface. Similar to the first library, the second library may be a component of the second application. Further, the second library may be installed with the second application. Logic of the interface may be utilized for the correlating.

Thus, in another embodiment, an additional application may be installed. Thus, at least one additional library associated with the additional application may be registered. In use, the logic may be adapted for interfacing the additional application with the first application and the second application using the libraries in the foregoing manner.

Thus, a plurality of data structures is provided for interfacing a plurality of applications. Such data structures may each include a library with a plurality of production events and a plurality of consumption events associated with a particular application.

In still yet another embodiment, a user may be alerted of the event. A first portion of the alert may relate to the first application. Similarly, a second portion of the alert may relate to the second application. Specifically, the first portion of the alert may relate to the first response of the first application and the second portion of the alert may relate to the second response of the second application. Optionally, the first portion and the second portion of the alert may be displayed to the user simultaneously via a single alert.

In another embodiment, the interface may further include a graphical user interface for allowing access to the first application and the second application. Such graphical user interface may further be used for indicating a status of the first application and the second application.

BRIEF DESCRIPTION OF THE DRAWINGS

Prior Art

DESCRIPTION OF THE PREFERRED EMBODIMENTS

Figure 1:
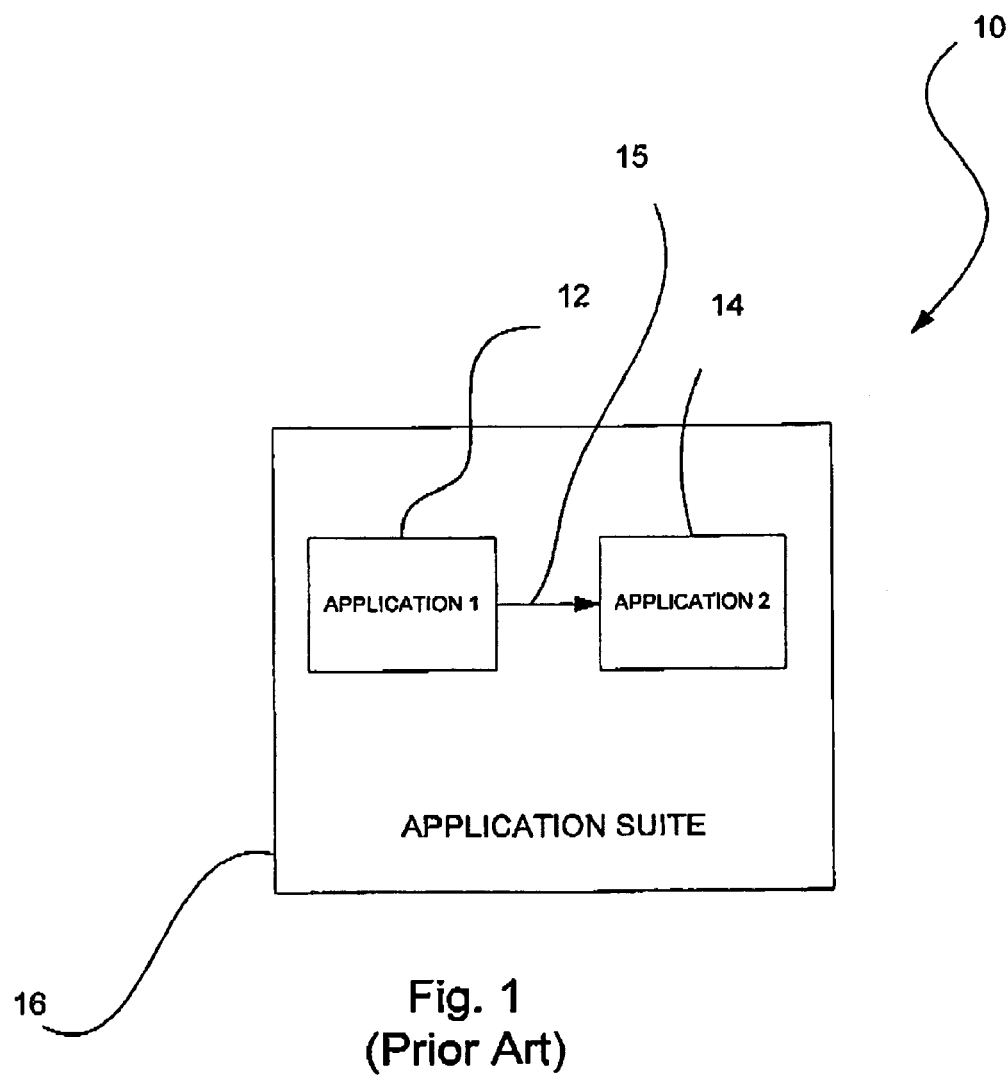
FIG. 1 illustrates one exemplary prior art system.
Figure 1A:
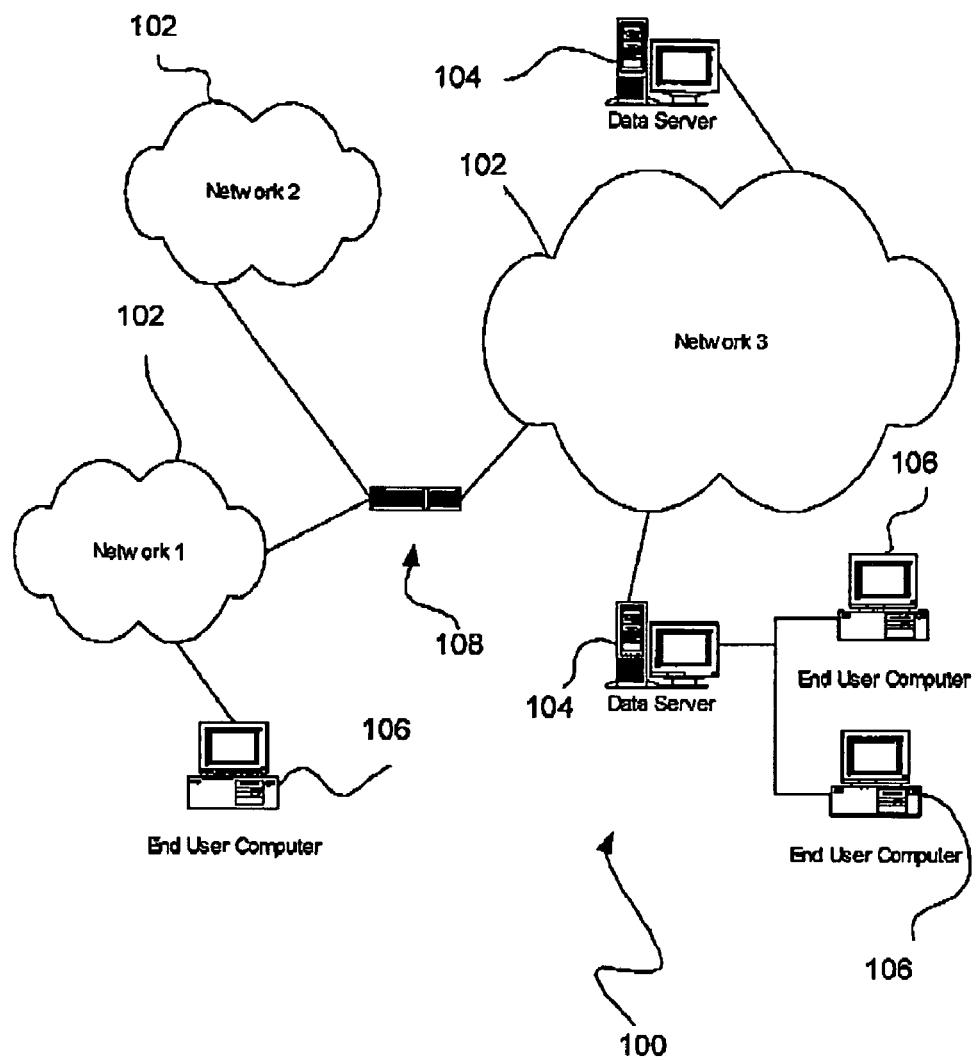
FIG. 1A illustrates a network architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween. It should be noted that each of the foregoing network devices as well as any other unillustrated devices may be interconnected by way of a plurality of network segments.

Figure 2:
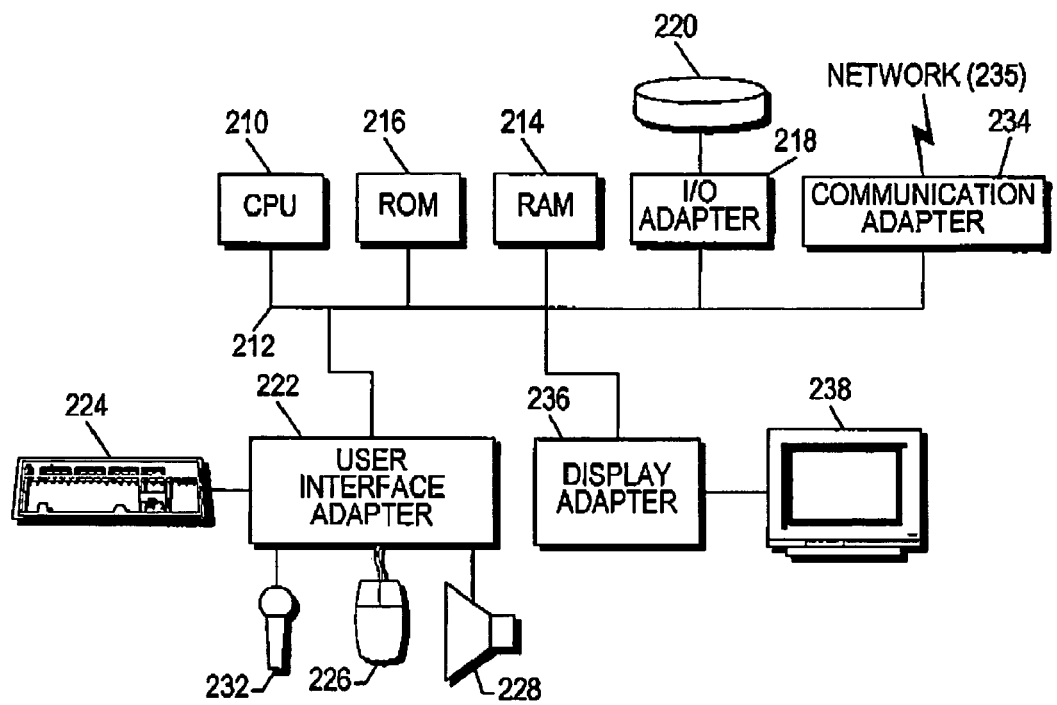
FIG. 2 shows a representative hardware environment that may be associated with the data server computers and/or end user computers of FIG. 1A, in accordance with one embodiment.

FIG. 2 shows a representative hardware environment that may be associated with the data server computers 104 and/or end user computers 106 of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
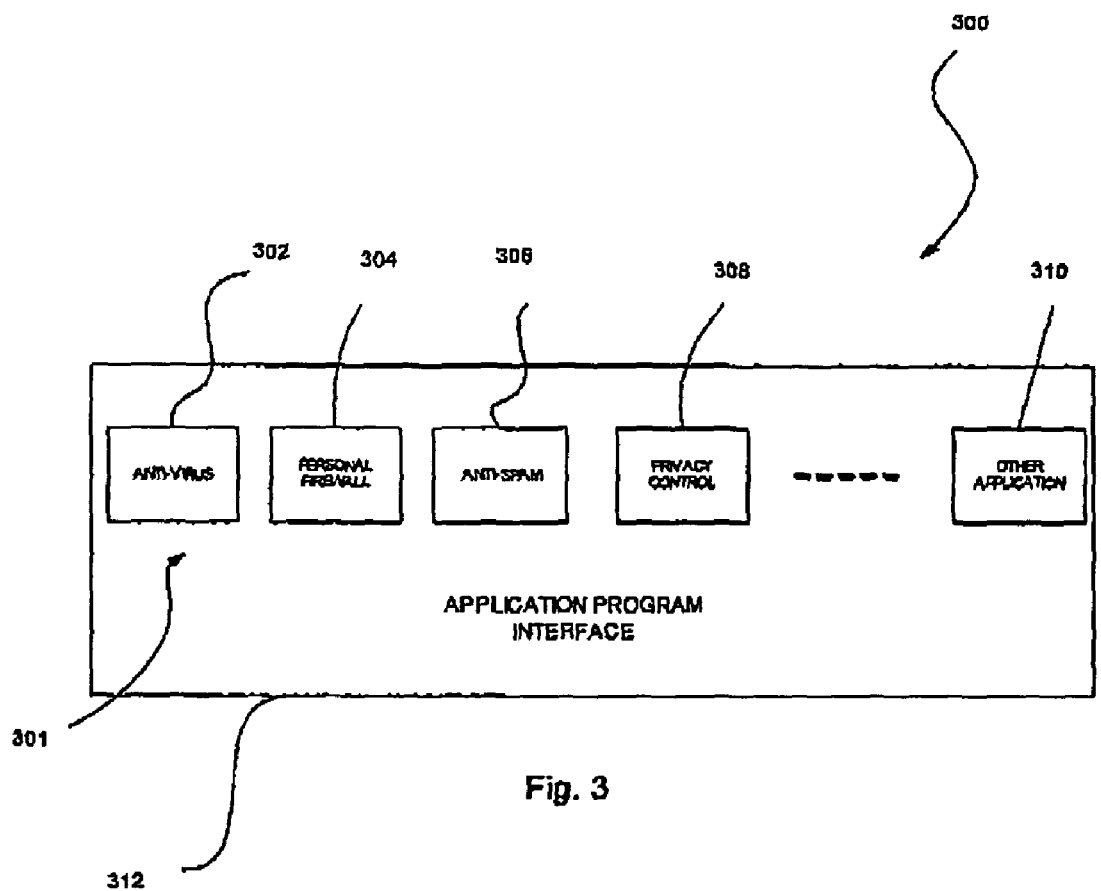
FIG. 3 illustrates a system adapted for interfacing a plurality of applications, in accordance with one embodiment.

FIG. 3 illustrates a system 300 adapted for interfacing a plurality of applications, in accordance with one embodiment. As an option, the present system 300 may be implemented in the context of the architecture of FIGS. 1 and 2. Of course, the system 300 may be implemented in any desired context.

As shown, included is a plurality of applications 301. In the context of the present description, such applications 301 may include any type of application program or computer code. For example, the applications 301 may optionally be security related. Of course, the applications 301 may be related to any other aspects such as business, maintenance, entertainment, etc.

In the security context, the applications 301 may include an anti-virus application 302, a firewall application 304, a content filtering application 308, an anti-spam application 306, and/or any other related application 310 (i.e. a utilities application, etc.).

In use, the anti-virus application 302 may be capable of scanning for viruses or other malicious code by comparing virus signature files with data located in memory or being transmitted via a network; and taking any appropriate response (i.e. quarantine data, delete data, clean data, alert user, etc.). Moreover, the firewall application 304 may be capable of blocking or alerting a user of accesses to a computer or network based on a predetermined set of rules or policies.

Still yet, the content filtering application 308 may be capable of protecting personal information on a computer and preventing the same from being shared. Still yet, the content filtering application 308 may be capable of preventing certain users from accessing predetermined content on a network such as the Internet. Moreover, the anti-spam application 306 may be capable of filtering electronic mail messages based on a predetermined rule set to prevent the receipt (or delivery) of unwanted e-mail.

It should be noted that each of the applications may be capable of reporting information back to the interface. For example, the firewall application may report hacker attacks in the form of a consumption event. In a similar manner, the anti-spam application may be able to report spam, viruses, etc.

As mentioned earlier, any other related application 310 may be included in the group of applications 301. For example, a utilities application may be included for executing various maintenance tasks associated with a computer (i.e. cleaning files, optimizing memory, etc.).

Further provided in combination with the applications 301 of the system 300 is an interface 312. In use, such interface 312 may include any specific method, technique or protocol by which an application program can communicate with an operating system or another application. In one embodiment, such interface 312 may include an application program interface.

In use, the interface 312 is capable of receiving a signal that an event has been detected or responded to by a first one of the applications 301. Thereafter, a second one of the applications 301 is prompted to respond to the event utilizing the interface 312.

As an option, the interface 312 may further include a graphical user interface for allowing access to the various applications 301. Such graphical user interface may further be used for indicating a status of the different applications 301.

It should be noted that the foregoing technique may be accomplished in any desired manner. Additional information regarding specific optional features will be set forth in greater detail during reference to the following figures.

Figure 3A:
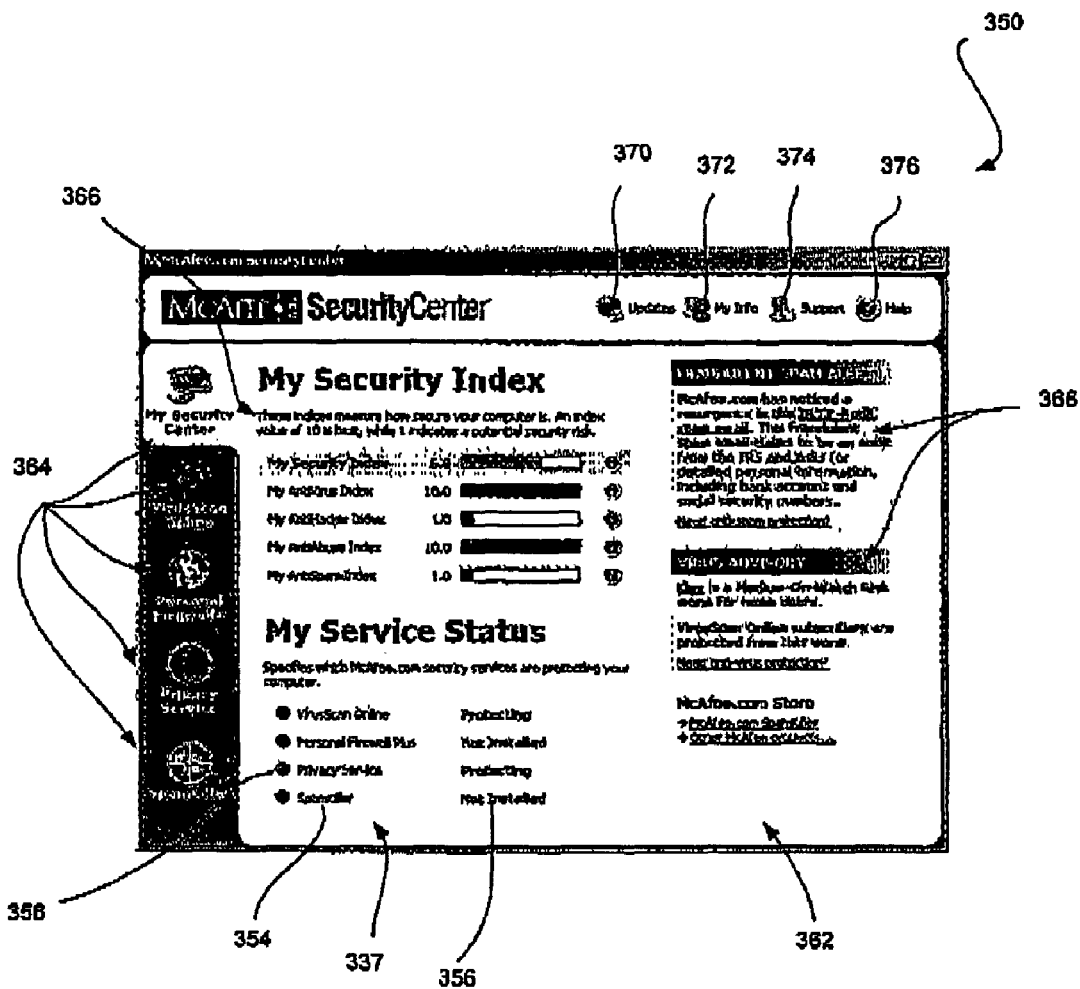
FIG. 3A shows an exemplary graphical user interface associated with the interface of FIG. 3.

FIG. 3A illustrates an exemplary graphical user interface 350 associated with the interface 312 of FIG. 3. To allow access to each of the applications via the single graphical user interface 350, the graphical user interface 350 may include a home page 362 and a plurality of selection icons 364 for allowing access to a plurality of windows (not shown) associated with each of the applications. Optionally, such windows may each include access to functionality associated with the corresponding one of the related applications.

In use, the home page 362 may be adapted for displaying a visual indication as to the status of each of the applications, along with various other information. For example, a security index 366 may be provided for indicating a level of risk associated with various aspects (i.e. security aspects) of a computer or networking environment. Further included is general information and alerts displayed in separate frames 368. As will soon become apparent, such alerts may be pushed from a server and further provide various options to a user. Still yet, the home page 362 may include an update icon 370, additional information icon 372, a support icon 374, and a help icon 376.

To convey the status of each of the applications, the home page 362 of the single graphical user interface 350 may include a list 337 of a plurality of applications 354. Still yet, the single graphical user interface 350 may include a plurality of status indicators 356 adjacent to each of the applications 354 in the list 337.

Each status indicator 356 may indicate whether the corresponding the application is installed. Moreover, each status indicator 356 may indicate whether the corresponding the application is enabled. Still yet, each status indicator 356 may indicate whether a subscription associated with the corresponding the application is expired. While this is shown to be accomplished using text, it should be noted that such status may be conveyed in any desired manner.

As an option, each status indicator 356 may be color coded. For example, an icon may be included as a status indicator 356, as shown. In use, such icon may exhibit a red color to reflect the fact that an application is not installed, disabled or expired; and a green color may indicate that the application is installed and running.

Of course, the status indicator 356 may include any combination of textual, graphic, numeric visuals that indicates a status of the applications 354. Moreover, such status may include installed, not installed, expired, enabled, disabled, or any other conceivable state of the applications.

Figure 4:
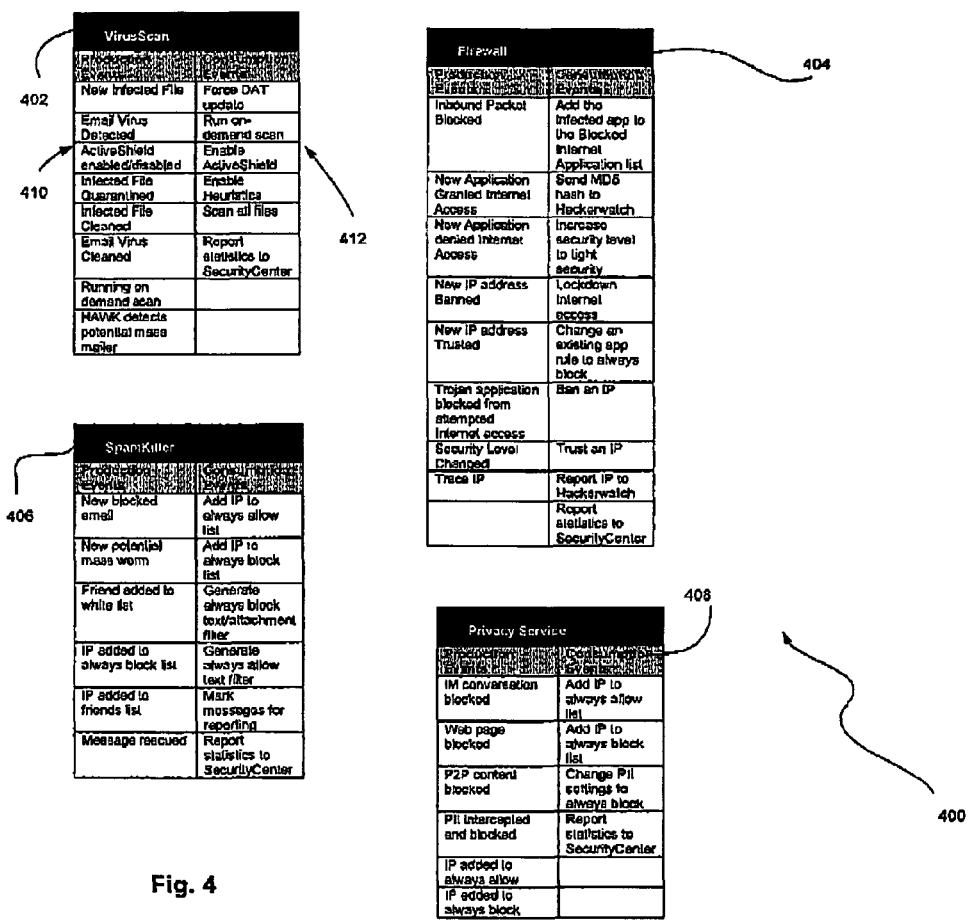
FIG. 4 illustrates a plurality of libraries adapted for facilitating the interfacing of a plurality of applications, in accordance with one embodiment.

FIG. 4 illustrates a plurality of libraries 400 adapted for facilitating the interfacing of a plurality of applications, in accordance with one embodiment. As an option, the libraries 400 may be implemented in the context of the system 300 of FIG. 3. Of course, the libraries 400 may be implemented in any desired context.

As shown, each of a plurality of applications may have a library associated therewith. In the context of FIG. 4, such libraries may include an anti-virus application library 402 associated with an anti-virus application such as that of FIG. 3, a firewall application library 404 associated with a firewall application such as that of FIG. 3, a content filtering application library 408 associated with a content filtering application such as that of FIG. 3, and an anti-spam application library 406 associated with an anti-spam application such as that of FIG. 3.

In particular, each of the libraries 400 may include a list of production events 410 and a plurality of consumption events 412. The production events 410 may include any responses generated by the application associated with the particular library. Still yet, the consumption events 412 may include any responses which the application is capable of receiving from other applications, and responding accordingly. It should be noted that the specific production events 410 and consumption events 412 listed in FIG. 4 are set forth for illustrative purposes only, and should not be construed as limiting in any manner.

In use, each of the libraries 400 may, in one embodiment, be installed on a computer in conjunction with the associated application. Moreover, each of the applications may be installed separately as desired. Of course, per the desires of the user, the libraries 400 may be installed at any time, and the applications may be installed in any combination.

In any case, logic associated with the aforementioned interface may utilize the foregoing libraries 400 to facilitate the appropriate interaction of the applications. More information regarding exemplary details as to the manner in which this is accomplished will be set forth hereinafter in greater detail.

It should be noted that the various events of the libraries 400 may be associated with applications from different companies, thus making the present technique vendor-independent. If an application developer feels that an action taken by their application may be interesting to other applications, the developer may register the action with the logic associated with the interface using the libraries 400. As an option, restrictions may be put into place regarding events that are registered. See, for example, Table 1 which includes a plurality of exemplary restrictions or requirements as to including the production events 410 in the appropriate libraries 400. Of course, such restrictions are strictly optional.

TABLE 1

Application can perform an action
The action is non-trivial and results in a "significant change" to the state of the user computer
A message is generated and transmitted to the interface when this action is performed
The feature is supported for the foreseeable future As a further option, certain fields may be included in the libraries 400 for each of the production events 410. See Table 2, for example.

TABLE 2

Product Source
Event Name (i.e. plain English, concise description, etc.)
Event Source (i.e. stateful response, user-action response, etc.)
Event Severity
Event Description (i.e. plain English description which MAY be displayed to end-user, etc.)
Event Parameters (i.e. XML based schema for describing additional information possibly contained in event, etc.)

Table 2A illustrates an exemplary production event associated with an anti-virus application.

TABLE 2A

Product Source: Anti-virus application
Event Name: "Infected File Detected"
Event Source: Stateful Response
Event Severity: High Severity
Event Description: "An anti-virus application has found an infected file on your computer."
Event Parameters: N/A
Filename: Path of the Infected File
InfectionName: AVERT name of virus/Trojan found
InfectionType: Trojan, Virus, Script-Virus, etc.

Table 3 includes a plurality of exemplary restrictions or requirements as to including consumption events 412 in the appropriate libraries 400. Again, such restrictions are strictly optional.

TABLE 3

The additional functionality augments a consumption event
There is a desire to change internal product settings in response to a consumption event Similar to the production events 410, certain fields may be included in the libraries 400 for each of the consumption events 410. See Table 4, for example.

TABLE 4

Consuming Product
Response Name
Response Description
Response Default Action
Response Additional Actions Table 4A illustrates an exemplary firewall application consumption event associated with the production event set forth in Table 2A.

TABLE 4A

Consuming Product: Firewall application
Response Name: "Infected Application Blocked"
Response Description: "A firewall application will block the infected file from accessing the Internet and optionally report the file to HackerWatch.org"
Response Default Action: Block
Response Additional Actions: Ignore, Report to HackerWatch.org It should be noted that the libraries 400 may be updated as desired. This may be accomplished utilizing a server-client communication, etc.

Figure 5:
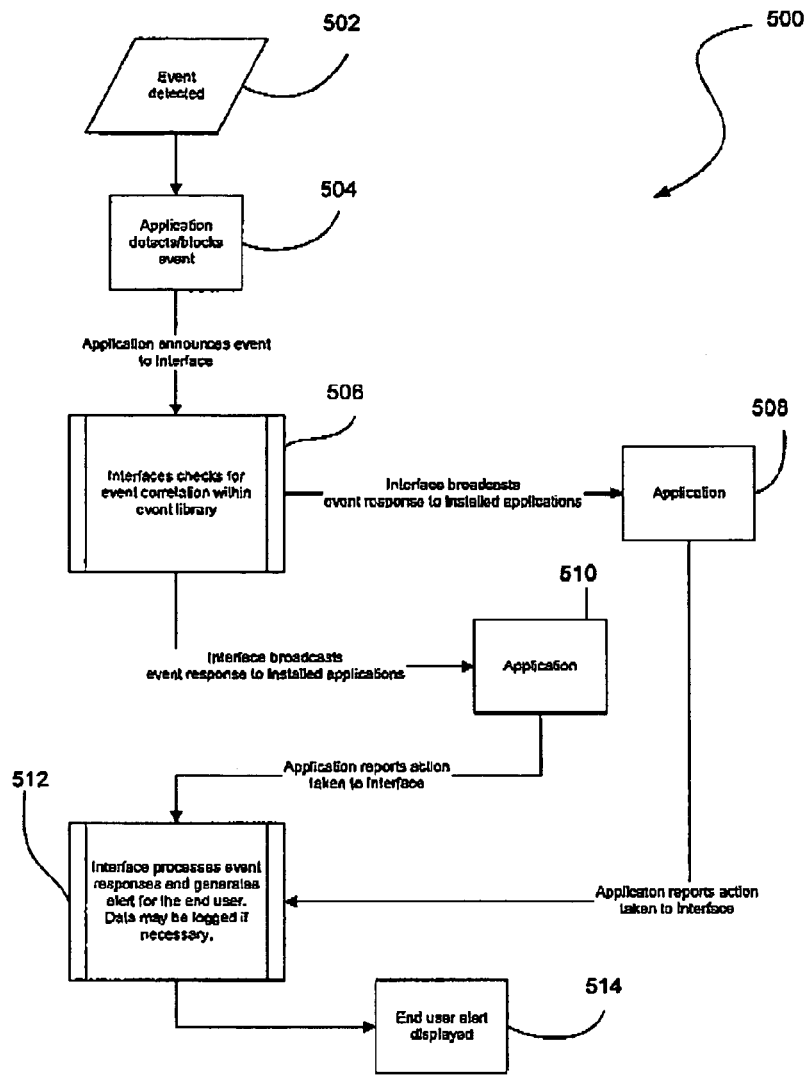
FIG. 5 illustrates a method for interfacing a plurality of applications, in accordance with one embodiment.

FIG. 5 illustrates a method 500 for interfacing a plurality of applications, in accordance with one embodiment. As an option, the method 500 may be implemented in the context of the system and libraries of FIGS. 3 and 4. Of course, the method 500 may be implemented in any desired context.

Initially, an event is detected with a first application. See operation 502. Such event may include any event on a computer or network associated with the application. Moreover, the first application may include any desired application. See, for example, the applications of FIG. 3. In the context of security applications, the event may include a security event. Such security event may include any event associated with the computer or network that may detrimentally affect the same in any manner.

Next, in operation 504, a first response to the event is processed utilizing the first application. Such processing may encompass any objective associated with the particular application. Next, the event and the first response are identified to the interface utilizing the first application. It should be noted that this or any type of signal may be sent to the interface for prompting a response by another application(s).

After such first response is identified in the first library, it is determined whether such production event correlates with a consumption event of another library associated with any other applications. Note operation 506.

If such a correlation is made, the appropriate consumption event or related signal is sent to the application(s). Note, for example, operations 508 and 510. Such actions, in turn, prompt further responses from the other application(s). Of course, such responses may be reported back to the interface for generating additional consumption events, and so on.

It should be noted that the interface may prompt responses from the other application(s) in any desired manner. Just by way of example, the libraries may be used during a registration process to configure the logic governing the interface. Moreover, the logic may be pre-configured and installed with a suite of applications. Of course, any technique capable of prompting responses from the other application(s) may be used.

When all of the appropriate responses have occurred, an alert may be generated in operation 512. Such alerting may be accomplished in any desired manner. For example, the first information may be received relating to the first response to the event associated with the first application. Moreover, second information may be received relating to a second response to the event associated with a second application, and so on. Of course, third and fourth information may be received to reflect the number of applications that have responded to a consumption event in the aforementioned manner.

With this information in hand, a single alert may be displayed including the first information and the second information. Such single alert may further include a window automatically displayed on a front most window of a user interface.

In various embodiments, the information relating to the responses to the event may include any data relevant to such responses. Just by way of example, the information may include a description of the event, which may be included in the single alert. Moreover, the first information may identify a proposed user action relating to the first application based on the event. Similarly, the second information may identify a proposed user action relating to the second application based on the event. Of course, the information may simply describe the automatic responses to the event by the applications. It should be noted that any combination of the foregoing information or any other information may be included per the desires of the user.

Since the amount of information reflected in the single alert may become cumbersome, a ranking may be associated with the first information and the second information. In such embodiment, the single alert may conditionally include the first information and the second information based on the ranking or any other threshold. To this end, only a predetermined amount of information is included in the single alert. Moreover, any type of medium may be employed for transmitting the alert (i.e. Windows® Pop-Up, .NET alert, e-mail, pager, cell phone, etc.

Figure 6:
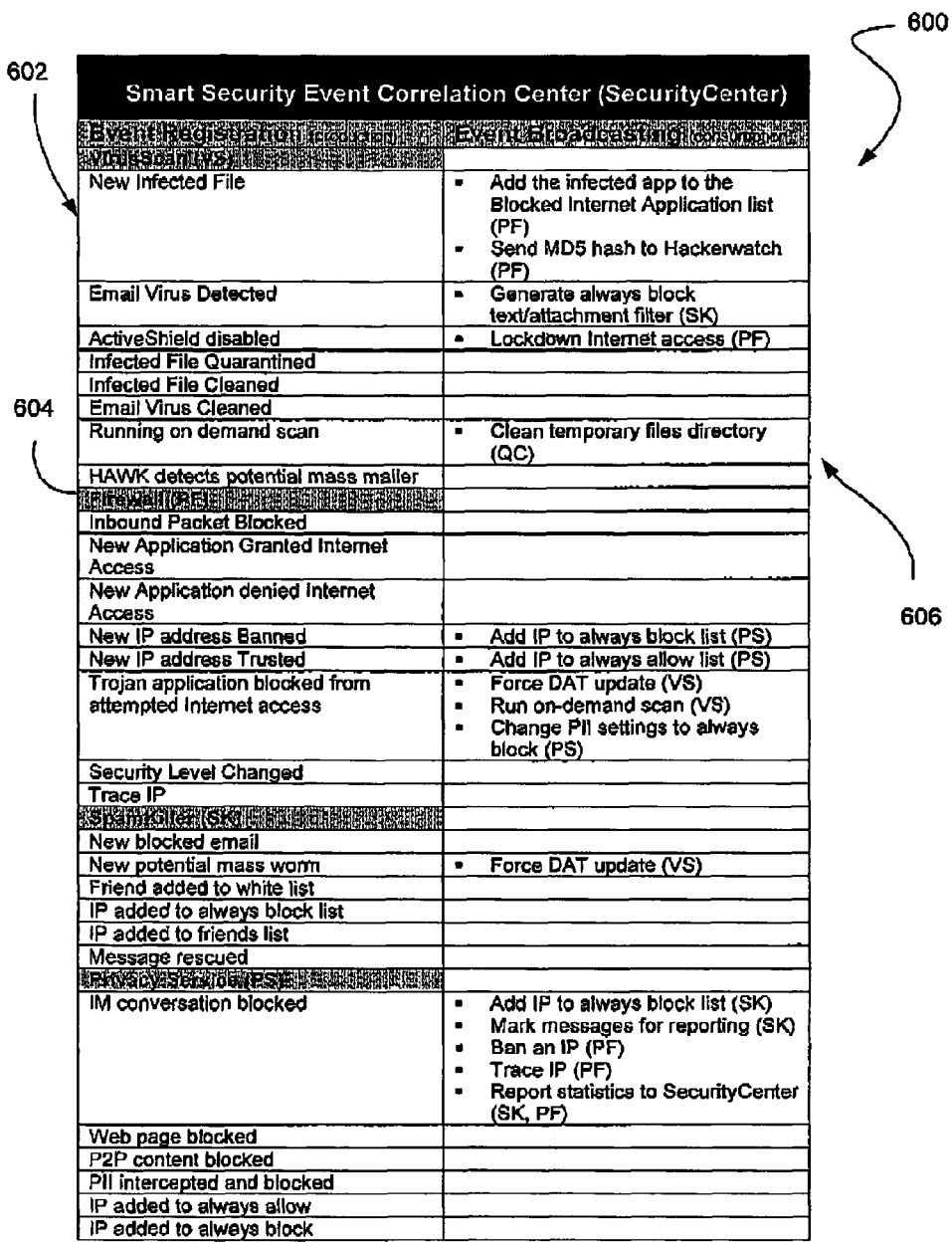
FIG. 6 illustrates an exemplary manner in which production and consumption events are correlated according to the method of FIG. 5 and in the context of the libraries of FIG. 4.

FIG. 6 illustrates an exemplary manner 600 in which production and consumption events are correlated according to the method 500 of FIG. 5 and in the context of the libraries 400 of FIG. 4. It should be noted that such correlation logic is set forth for illustrative purposes only, and should not be construed as limiting in any manner.

As shown, a plurality of production events 602 is shown to be associated with various applications 604. Such production events 602 are, in turn, correlated with various consumption events 606.

As shown, a firewall application may consume a "New Infected File Detected" production event from the anti-virus application, and, as consumption events, automatically add the infected file to a blocked Internet application list and send a hash of the application to a hacker tracking website (i.e. HackerWatch.org). Still yet, the anti-virus application may consume a "Trojan application blocked" production event from the firewall application, and automatically perform a scan of the user's hard drive. Moreover, a content filtering application may consume a "New Internet Protocol Address (IP) Trusted" production event from the firewall application, and automatically add the trusted IP to its trusted site list. Still other examples are set forth in FIG. 6 for illustrative purposes.

Figure 7:
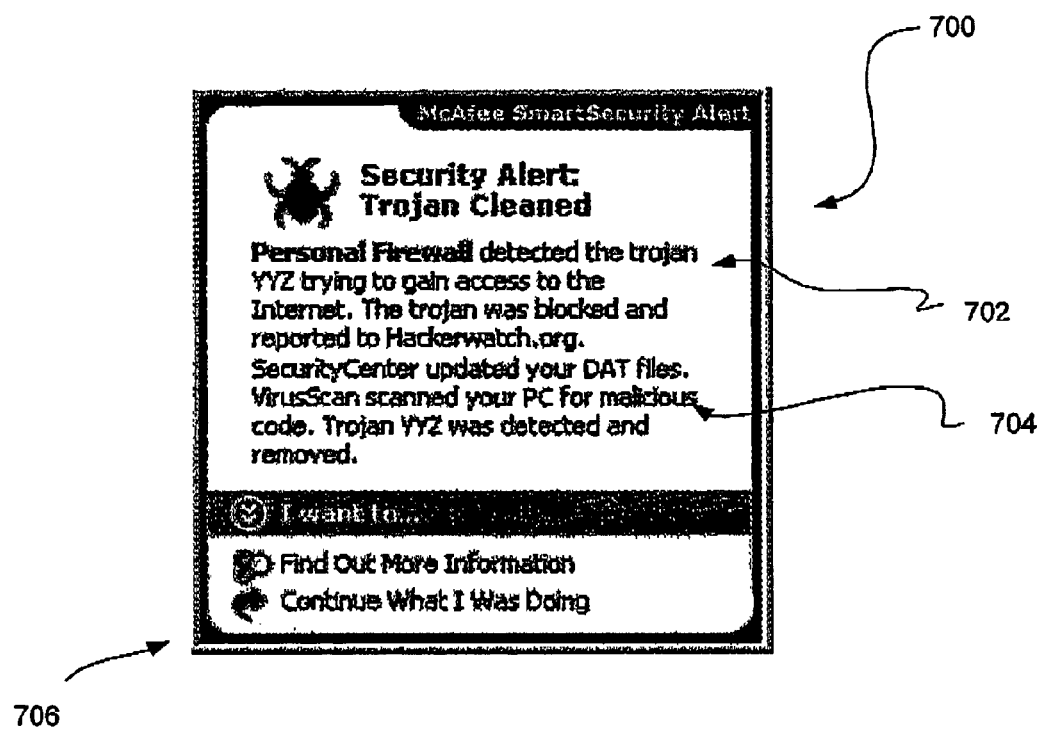
FIG. 7 illustrates an exemplary alert that may be generated according to the method of FIG. 5 and in the context of the libraries and correlation of FIGS. 4 and 6, respectively.

FIG. 7 illustrates an exemplary alert 700 that may be generated according to the method 500 of FIG. 5 and in the context of the libraries 400 and correlation 600 of FIGS. 4 and 6, respectively. It should be noted, of course, that such alert 700 is set forth for illustrative purposes only, and should not be construed as limiting in any manner.

As shown, the alert 700 may include the various information related to the event and the responses to the event by various applications. For example, a first portion 702 of the alert 700 may relate to the first application (i.e. a firewall application). Similarly, a second portion 704 of the alert 700 may relate to the second application (i.e. an anti-virus application). Specifically, the first portion 702 of the alert 700 may relate to the response of the first application and the second portion 704 of the alert 700 may relate to the response of the second application. Optionally, the first portion 702 and the second portion 704 of the alert 700 may be displayed to the user simultaneously via a single alert.

Again, the information included with the alert 700 may include a description of the event, a proposed user action relating to an application based on the event, and/or a description of the response to the event by an application. It should be noted that any combination of the foregoing information or any other information may be included per the desires of the user.

As an option, the single alert 700 may include a plurality of selection icons 706 capable of being selected by a user for executing at least one of the proposed user actions, if any. Such selection icons may include links (i.e. hyperlinks, etc.) for connecting to a server or the like for carrying out the proposed user actions. As shown in FIG. 7, such actions may include an option to find out more information about the event, launch an application, continuing by doing nothing, etc.

Such response options may be carried out by the selection thereof by a user utilizing a mouse-click or the like. While this may be accomplished in any desired manner, one exemplary method may include the technique set forth in U.S. Pat. No. 6,266,774 entitled "Method and system for securing, managing or optimizing a personal computer," which is incorporated herein by reference in its entirety.

In one embodiment, the single alert 700 may be pushed to a plurality of computers from a server, as opposed to a reaction to an application response on a computer. In the context of the present description, such pushing may include any technique where the server initiates the delivery of the alert 700 to the user computers. It should be noted that the foregoing pushing may be accomplished in a variety of foreseeable ways. Just by way of example, the alert 700 pushed from the server to the user computers may actually come as the result of a programmed request from the user computers. That is, a client program may be used to initiate such pushed alerts 700. Still yet, the pushing may include a simple broadcasting of the alert 700. In this case, the alert 700 may be pushed to the user computers that have access to a particular channel or frequency. Broadcast may (but not always) involve a continuous flow of information.

The foregoing embodiments may thus be useful in a variety of contexts. Just by way of example, if a content filtering application detected someone talking inappropriately to a child, the chat may be blocked and logged. This, in turn, may be reported to the interface which would broadcast this information to the other applications present on the user's computer. An anti-spam application, for example, may obtain the information on the person propositioning the child over instant messenger and ensure that all e-mails from that person are blocked and logged. Personal firewall may, in turn, add the associated IP address to a banned list. Still yet, a visual trace may then trace the IP to the location of the service provider. As such, the embodiment of the present example may enable the parent to know who, what, when and how information, and would also have all the information available for a report for the authorities.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method performed utilizing a common interface on a computer system for interfacing a plurality of applications, comprising:
   receiving a signal at a common interface that a first application has detected and responded to an event with a first response, the first application utilizing the common interface for the first response, the first response separate from the signal;
   correlating, utilizing logic of the common interface, the first response with a second response to the event, the second response from a second application utilizing the common interface; and
   prompting, via the common interface, user selection of one or more proposed user actions, the user selection to initiate the second response to the event by the second application, the second application utilizing the common interface for the second response;
   wherein the second application includes an application that includes at least one of an anti-virus application, a firewall application, a content filtering application, a utilities application, and an anti-spam application;
   wherein the first application includes an application that includes at least one of an anti-virus application, a firewall application, a content filtering application, a utilities application, and an anti-spam application; and
   wherein the first application and second application are different.

2. The method as recited in claim 1, wherein the common interface includes an application program interface.

3. The method as recited in claim 1, further comprising identifying the first response in a first library of the first application, the first application utilizing the common interface.

4. The method as recited in claim 3, wherein the first library comprises a component of the first application.

5. The method as recited in claim 4, wherein the first library is installed with the first application.

6. The method as recited in claim 3, further comprising correlating the first response with the second response in a second library of the second application, the second application utilizing the common interface.

7. The method as recited in claim 6, wherein the second library is a component of the second application.

8. The method as recited in claim 7, wherein the second library is installed with the second application.

9. The method as recited in claim 6, wherein logic of the common interface is utilized for the correlating.

10. The method as recited in claim 9, further comprising installing an additional application.

11. The method as recited in claim 10, further comprising identifying at least one additional library associated with the additional application.

12. The method as recited in claim 11, wherein the logic of the common interface is utilized for interfacing the additional application with the first application and the second application.

13. The method as recited in claim 1, further comprising alerting a user of the event.

14. The method as recited in claim 13, wherein a first portion of the alert relates to the first application and a second portion of the alert relates to the second application.

15. The method as recited in claim 14, wherein the first portion of the alert relates to the first response of the first application and the second portion of the alert relates to the second response of the second application.

16. The method as recited in claim 14, wherein the first portion and the second portion of the alert are displayed to the user simultaneously via a single alert.

17. The method as recited in claim 1, wherein the graphical user interface is also adapted for indicating a first status of the first application and a second status of the second application.

18. The method as recited in claim 1, wherein the event includes a security event.

19. A computer program product embodied on a non-transitory computer readable medium for interfacing a plurality of applications via a common interface on a computer system, comprising:
  computer code to receive a signal at a common interface that a first application has detected and responded to an event with a first response, the first application utilizing the common interface for the first response, the first response separate from the signal;
  computer code to correlate the first response with a second response to the event, the second response from a second application utilizing the common interface for the second response; and
  computer code to prompt, via the common interface, user selection of one or more proposed user actions, the user selection to initiate the second response to the event by the second application;
  wherein the second application includes an application that includes at least one of an anti-virus application, a firewall application, a content filtering application, a utilities application, and an anti-spam application;
  wherein the first application includes an application that includes at least one of an anti-virus application, a firewall application, a content filtering application, a utilities application, and an anti-spam application; and
  wherein the first application and second application are different.

20. A computer system including one or more processors;
  a non-transitory computer readable medium;
  a plurality of applications stored on the non-transitory computer readable medium and executing on the one or more processors; and
  a common interface for interfacing a plurality of applications, the computer system comprising:
    a first application for detecting an event and generating a first response to the event, utilizing one of the one or more processors;
    an application program interface to the common interface in communication with the first application, the common interface for receiving a signal from the first application, the signal reflecting at least one of the event and the first response, the first response separate from the signal; and
    a second application in communication with the application program interface to the common interface for being prompted, the prompt initiated by the common interface in response to user selection of one or more proposed user actions, to generate a second response to the event, the second response utilizing the application interface and in response to the receipt of the signal from the first application at the common interface;
    wherein the first response is correlated, utilizing correlation logic of the common interface, with the second response to the event by the second application;
    wherein the second application includes an application that includes at least one of an anti-virus application, a firewall application, a content filtering application, a utilities application, and an anti-spam application;
    wherein the first application includes an application that includes at least one of an anti-virus application, a firewall application, a content filtering application, a utilities application, and an anti-spam application; and
    wherein the first application and second application are different.

21. An application program interface to a common interface and the common interface embodied on a non-transitory computer readable medium, the common interface for interfacing a plurality of applications on a computer system, the non-transitory computer readable medium comprising:
  computer code to cause a processor to receive a signal, at a common interface, from a first security application, the first security application capable of detecting and responding to a security event with a first response, the first response separate from the signal and prompting, via the common interface, user selection of one or more proposed user actions, the user selection to initiate a second response to the security event by a second security application in response to the receipt of the signal;
  wherein the second security application includes an application that includes at least one of an anti-virus application, a firewall application, a content filtering application, a utilities application, and an anti-spam application;
  wherein the first security application includes an application that includes at least one of an anti-virus application, a firewall application, a content filtering application, a utilities application, and an anti-spam application; and
  wherein the first security application and second security application are different;
  wherein the first response is correlated, utilizing correlation logic of the common interface, with the second response.

22. A computer program product embodied on a non-transitory computer readable medium, the computer program product comprising:
  computer code for a smart security application embodied on the non-transitory computer readable medium, the smart security application for signaling an application program interface of a common interface, the signaling an indication of a security event,
  wherein the smart security application is capable of detecting and responding to the security event with a first response,
  wherein the common interface is capable of prompting for user selection of one or more proposed user actions, the user selection to initiate a second response to the security event by another security application utilizing a signal separate from the first response,
  wherein the first response is correlated, utilizing correlation logic of the common interface, with the second response,
  wherein the smart security application includes an application that includes at least one of an anti-virus application, a firewall application, a content filtering application, a utilities application, and an anti-spam application;
  wherein the another security application includes an application that includes at least one of an anti-virus application, a firewall application, a content filtering application, a utilities application, and an anti-spam application; and
  wherein the smart security application and the another security application are different.

23. A method performed utilizing a common interface on a computer system for interfacing a plurality of applications, comprising:

detecting an event with a first application;

processing a first response to the event utilizing the first application;

identifying the event and the first response to a common interface utilizing the first application and a signal separate from the first response;

locating, using logic of the common interface, the first response in a first library associated with the first application;

correlating, using correlation logic of the common interface, the first response with a second response of a second library associated with a second application;

prompting, via the common interface, user selection of one or more proposed user actions, the user selection to initiate the second response by the second application based on the correlation; and alerting a user of the event, the first response, and the second response wherein the alerting, the first response and the second response each utilize the common interface;

wherein the first application and the second application include applications that includes at least one of an anti-virus application, a firewall application, a content filtering application, a utilities application, and an anti-spam application; and wherein the first application and the second application are different.

24. The method as recited in claim 1, wherein the second application includes an anti-virus application.

25. The method as recited in claim 1, wherein the second application includes a firewall application.

26. The method as recited in claim 1, wherein the second application includes an anti-spam application.

27. The method as recited in claim 16, wherein the single alert includes a description of the event, a proposed action based on the event, and a description of a response to the event.

28. The method as recited in claim 16, wherein the single alert includes a plurality of icons capable of being selected by the user for executing at least one proposed action.

29. The method as recited in claim 17, wherein the first status of the first application includes an indication of a first state of the first application and the second status of the second application includes an indication of a second state of the second application, the first state and the second state each including one of running, installed, not installed, expired, enabled, and disabled.

30. The method as recited in claim 1, wherein the graphical user interface includes a home page and a plurality of selection icons for allowing access to a plurality of windows associated with each of the applications.

31. The method as recited in claim 30, wherein the windows each include access to functionality associated with a corresponding one of the applications.

32. The method as recited in claim 6, wherein the second library includes an anti-spam application library.

33. The method as recited in claim 3, wherein the first library includes a list of production events and a plurality of consumption events.

34. The method as recited in claim 33, wherein the production events include responses generated by the first application associated with the first library.

35. The method as recited in claim 33, wherein the consumption events include responses which the first application is capable of receiving from other applications, and responding accordingly.

* * * * *